(12) United States Patent
Suzuki et al.

(10) Patent No.: US 9,906,103 B2
(45) Date of Patent: Feb. 27, 2018

(54) ROTARY ELECTRICAL MACHINE COOLING APPARATUS

(71) Applicants: TOYOTA JIDOSHA KABUSHIKI KAISHA, Toyota-shi, Aichi-ken (JP); AISIN AW CO., LTD., Anjo-shi, Aichi-ken (JP)

(72) Inventors: Shinjiro Suzuki, Kariya (JP); Taketo Takeuchi, Nishio (JP); Kazuki Asada, Anjo (JP)

(73) Assignees: TOYOTA JIDOSHA KABUSHIKI KAISHA, Toyota-shi, Aichi-ken (JP); AISIN AW CO., LTD., Anjo-shi, Aichi-ken (JP)

(*) Notice: Subject to any disclaimer, the term of this patent is extended or adjusted under 35 U.S.C. 154(b) by 309 days.

(21) Appl. No.: 14/676,321

(22) Filed: Apr. 1, 2015

(65) Prior Publication Data
US 2015/0295473 A1 Oct. 15, 2015

(30) Foreign Application Priority Data

Apr. 11, 2014 (JP) .................................. 2014-081676

(51) Int. Cl.
*H02K 9/19* (2006.01)
*H02K 1/32* (2006.01)

(52) U.S. Cl.
CPC ................. *H02K 9/19* (2013.01); *H02K 1/32* (2013.01)

(58) Field of Classification Search
CPC .. H02K 9/19; H02K 1/32; H02K 5/20; H02K 3/24; H02K 9/197; H02K 3/44; H02K 9/193; H02K 2209/00
(Continued)

(56) References Cited

U.S. PATENT DOCUMENTS 6,515,384 B1 * 2/2003 Kikuchi ................. H02K 9/197
310/54
7,284,312 B2 * 10/2007 Oohashi ................. H02K 15/12
29/596
(Continued)

FOREIGN PATENT DOCUMENTS

DE 102012017293 A1 * 2/2014 ............... H02K 5/20
EP 2058926 A2 * 5/2009 ............... H02K 1/20
(Continued)

OTHER PUBLICATIONS

Machine Translation of JP 2008301582 A.*
Machine Translation of DE 102012017293 A1.*

*Primary Examiner* — John K Kim
(74) *Attorney, Agent, or Firm* — Sughrue Mion, PLLC (57) ABSTRACT

A rotary electrical machine cooling apparatus includes: a rotary electrical machine including a stator having an annular resin portion which covers a coil end, and a rotor; and a cooling portion that injects a coolant from an upper side to the annular resin portion. The annular resin portion includes: an annular main body portion, and a plurality of island portions that protrude in the axial direction from a plurality of positions in a circumferential direction of an axially outer end face of the annular main body portion. The plurality of island portions include a plurality of first island portions having first maximum circumferential lengths and a second island portion that has a second maximum circumferential length L2 and the coolant impinges on the outer circumferential face to flow in a circumferential direction. Thus, the coolability of the coil can be improved.

8 Claims, 5 Drawing Sheets

(58) Field of Classification Search
USPC .. 310/154, 156, 800, 10, 43, 54, 64, 58, 59, 310/56, 45, 52, 53, 60 A, 60 R, 61, 62, 63
See application file for complete search history.

(56) References Cited

U.S. PATENT DOCUMENTS

| | | | | |
|---|---|---|---|---|
| 7,791,238 B2* | 9/2010 | Pal | ........................ | F04D 25/082 |
| | | | | 310/156.12 |
| 8,247,934 B2* | 8/2012 | Matsui | ..................... | H02K 9/19 |
| | | | | 310/53 |
| 8,552,603 B2* | 10/2013 | Minemura | ............... | H02K 9/19 |
| | | | | 310/52 |
| 9,343,943 B2* | 5/2016 | Hattori | ..................... | H02K 9/19 |
| 2007/0278869 A1* | 12/2007 | Taketsuna | ................. | H02K 9/19 |
| | | | | 310/54 |
| 2014/0125165 A1 | 5/2014 | Miyamoto et al. | | |

FOREIGN PATENT DOCUMENTS

| | | | | | |
|---|---|---|---|---|---|
| FR | | 2927736 A1 * | 8/2009 | ............... | H02K 1/20 |
| JP | | 2008-301582 A | 12/2008 | | |
| JP | | 2008301582 A * | 12/2008 | | |
| JP | | 2013-9508 A | 1/2013 | | |
| WO | WO 2012176052 A2 * | | 12/2012 | ............... | H02K 1/32 |

\* cited by examiner

ROTARY ELECTRICAL MACHINE COOLING APPARATUS

PRIORITY INFORMATION

This application claims priority to Japanese Patent Application No. 2014-081676, filed on Apr. 11, 2014, which is incorporated herein by reference in its entirety.

BACKGROUND

Technical Field

The present invention relates to a rotary electrical machine cooling apparatus that includes a rotary electrical machine including a stator having an annular resin portion which covers a coil end, and a cooling portion which injects a coolant to the annular resin portion. More particularly, the present invention relates to improving the coolability of a coil which was covered by the annular resin portion.

Conventionally, as a stator of a rotary electrical machine, a configuration is known that has an annular resin portion which covers a coil end of an axial end portion. By this means, compared to a case of fixing a coil end by varnish impregnation, automation during manufacture of the rotary electrical machine is promoted and costs can be reduced. With regard to rotary electrical machines, a rotary electrical machine cooling apparatus is also known that cools an inner coil of the rotary electrical machine by cooling the annular resin portion with a coolant.

Japanese Patent Laid-Open Publication No. 2008-301582 discloses a rotary electrical machine cooling apparatus having a configuration in which a plurality of island portions that are separated in the circumferential direction and project in the axial direction are formed at an axially outer end face of an annular resin portion, and in which a coolant is supplied to a portion that matches in the circumferential direction with one island portion from a coolant supply portion on an upper side at an outer circumferential face of the annular resin portion. It is described that, by this means, as a result of the coolant flowing downward while passing between adjacent island portions at the axially outer end face of the annular resin portion, a time period during which the coolant comes in contact with the surface of the annular resin portion is lengthened, and hence the coolability of the rotary electrical machine is improved.

In Japanese Patent Laid-Open Publication No. 2013-9508, a configuration is disclosed in which a coolant that is injected to an inner diameter side of a stator from an injection portion of a rotating shaft strikes against a coil end to thereby cool the coil end.

Japanese Patent Laid-Open Publication No. 2008-301582 does not include a description concerning making a circumferential length of some island portions among the plurality of island portions formed in the annular resin portion larger than the remaining island portions. Consequently, in a case where the coolant is supplied to and impinges on an outer circumferential face of one island portion from the coolant supply portion, the coolant may sometimes flow straight down from a circumferential end portion of the island portion without flowing sufficiently in the circumferential direction. In this case, improvement is desirable from the viewpoint of improving the coolability of a coil which was covered by the annular resin portion. Means for solving this problem is not disclosed in either of Japanese Patent Laid-Open Publication No. 2008-301582 and Japanese Patent Laid-Open Publication No. 2013-9508.

SUMMARY

An advantage of the present invention is that the present invention provides a rotary electrical machine cooling apparatus that can improve the coolability of a coil by cooling many portions in a circumferential direction of an annular resin portion of a stator.

A rotary electrical machine cooling apparatus according to the present invention includes: a rotary electrical machine including a stator and a rotor, in which the stator has an annular resin portion which covers a coil end; and a cooling portion that injects a coolant from an upper side to the annular resin portion; wherein: the annular resin portion includes an annular main body portion that is provided on a stator core side in an axial direction of the stator, and a plurality of island portions that protrude in an axial direction from a plurality of positions in a circumferential direction of an axially outer end face of the annular main body portion; and the plurality of island portions include a plurality of first island portions that have a first maximum circumferential length, and a second island portion that has a second maximum circumferential length which is greater than the first maximum circumferential length of the respective first island portions and that is formed at a position such that the coolant impinges on an outer circumferential face thereof and that causes the coolant that impinges on the outer circumferential face to flow in a circumferential direction.

According to the rotary electrical machine cooling apparatus of the present invention, since many portions in a circumferential direction of an annular resin portion can be cooled by a coolant, the coolability of a coil can be improved.

DETAILED DESCRIPTION

Hereunder, an embodiment according to the present invention will be described with reference to the accompanying drawings. In the following description, the specific shapes and numbers of pieces are examples for facilitating understanding of the present invention and may be appropriately changed according to the specifications.

In a case where a plurality of embodiments or modifications or the like are included hereunder, the present invention can be implemented by appropriately combining the plurality of embodiments or modifications or the like. In the following description, like constituent elements are denoted by like reference numerals in all of the drawings.

A rotary electrical machine cooling apparatus 10 of the present embodiment includes a rotary electrical machine 12, and a cooling portion 50 that cools the rotary electrical machine 12. The rotary electrical machine 12 is used, for example, as a motor that drives a hybrid vehicle, or as a generator, or as a motor-generator that has both of the aforementioned functions. When using the rotary electrical machine 12 as a motor-generator, the rotary electrical machine cooling apparatus of the present embodiment can be applied in either of a case where the rotary electrical machine 12 is applied in particular as a first motor-generator that is used as a generator, and a case where the rotary electrical machine 12 is applied in particular as a second motor-generator that is used as a running motor. The rotary electrical machine 12 can also be used as a running motor of an electric vehicle or a fuel cell vehicle other than a hybrid vehicle.

Figure 1:
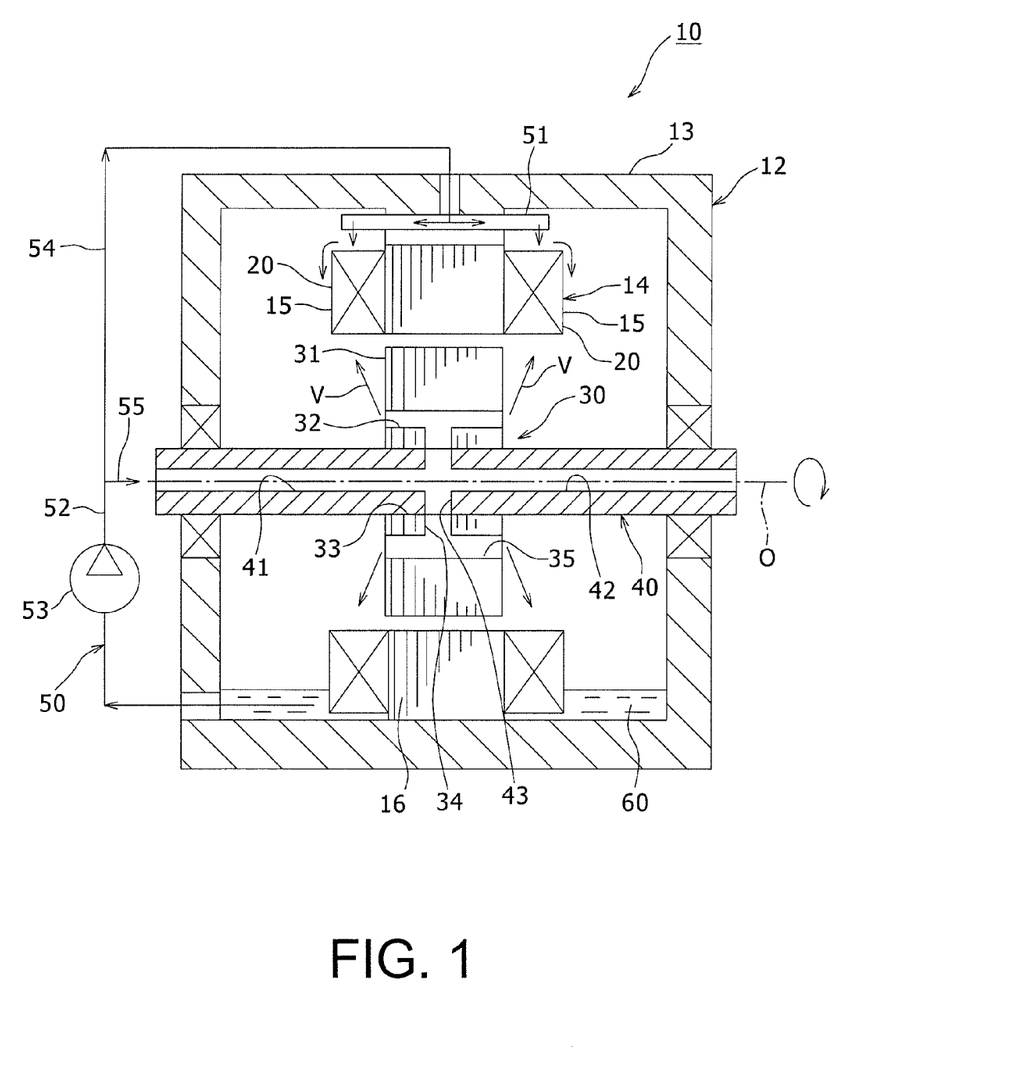
FIG. 1 is a schematic cross-sectional view of a rotary electrical machine cooling apparatus of an embodiment according to the present invention.
Figure 2:
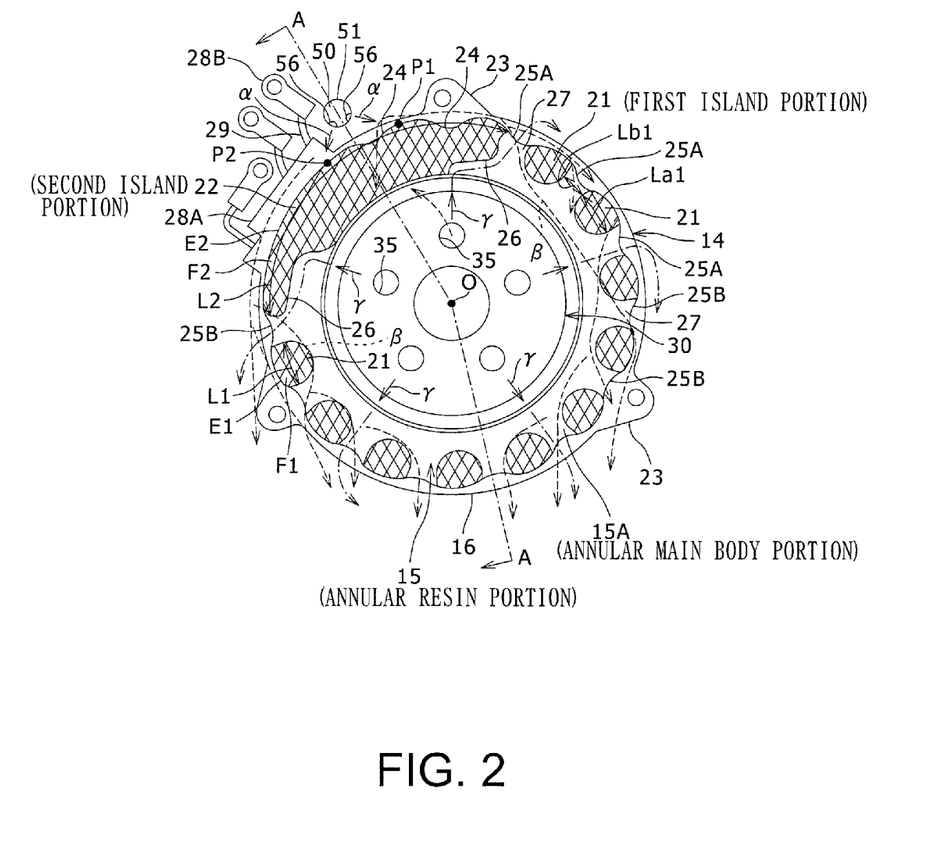
FIG. 2 is a view in which a stator and a rotor that are shown in FIG. 1 are seen in an axial direction, with some parts omitted.

FIG. 1 is a schematic cross-sectional view of the rotary electrical machine cooling apparatus 10. FIG. 2 is a view in which a stator 14 and a rotor 30 that are shown in FIG. 1 are seen in an axial direction, with some parts omitted.

The rotary electrical machine 12 is a synchronous motor with permanent magnets that is driven by a three-phase alternating current, and includes a rotating shaft 40 that is rotatably supported inside a motor case 13, the rotor 30 that is fixed to the circumference of the rotating shaft 40, and a stator 14 that is provided facing an outer diameter side of the rotor 30 with a predetermined air gap therebetween and that is fixed to the motor case 13. The term "radial direction" refers to a radiation direction that is orthogonal to a rotation central axis O of the rotor 30. The term "axial direction" refers to a direction that is parallel to the rotation central axis O of the rotor 30. The term "circumferential direction" refers to a direction along a circle that is drawn with the rotation central axis O of the rotor 30 as a center.

The rotor 30 includes a cylindrical rotor core 31, and magnets, not shown in the drawings, that are arranged at a plurality of positions in the circumferential direction of the rotor core 31. The rotor core 31 has a laminated body that is fabricated by laminating a plurality of disc-shaped electromagnetic steel plates on one another in the axial direction. The rotor core 31 may also be formed of a dust core that is obtained by pressure-forming magnetic powder and a resin binder.

Each magnet has a magnetic property magnetized in a radial direction of the rotor 30 or in a direction inclined with respect to the radial direction. A pair of end plates, not shown in the drawings, may also be provided one on each side of the rotor core 31 in the axial direction, and the rotor core 31 may be sandwiched by the pair of end plates from both sides in the axial direction.

The rotor core 31 has a core-side coolant passage 32 that is provided inside the rotor core 31, and through which oil that is a coolant circulates. The core-side coolant passage 32 has a plurality of radial passages 34 that are formed in a radial shape from a center hole 33 formed at a center portion of the rotor core 31, and axial passages 35 that are inner-diameter-side coolant injection portions which are connected to an outer end in the radial direction of the respective radial passages 34 and which penetrate through the rotor core 31 in the axial direction and inject oil from both ends in the axial direction. A rotating shaft 40 is fitted and fixed in the center hole 33.

The rotating shaft 40 includes an axial passage 42 formed in a central portion thereof, and a shaft-side coolant passage 41 having radial passages 43 that are radially connected to an intermediate portion of the axial passage 42. The radial passages 43 are connected to the radial passages 34 of the rotor 30. Oil is supplied to the axial passage 42 from a cooling portion 50, described later. By this means, oil is supplied to the axial passages 35 of the core-side coolant passage 32, and by the action of a centrifugal force when the rotor 30 rotates, the axial passages 35 inject the oil towards the outer side in the radial direction from both end portions in the axial direction. By this means, the oil is injected towards an inner circumferential face of annular resin portions 15, described later, that are formed on the stator 14. For example, as indicated by arrows V in FIG. 1, the oil is injected from both ends of the axial passages 35 towards the outer side in the axial direction in directions that are inclined relative to the outer sides in the radial direction. Apart from oil, for example, cooling water may also be used as a coolant.

Figure 3:
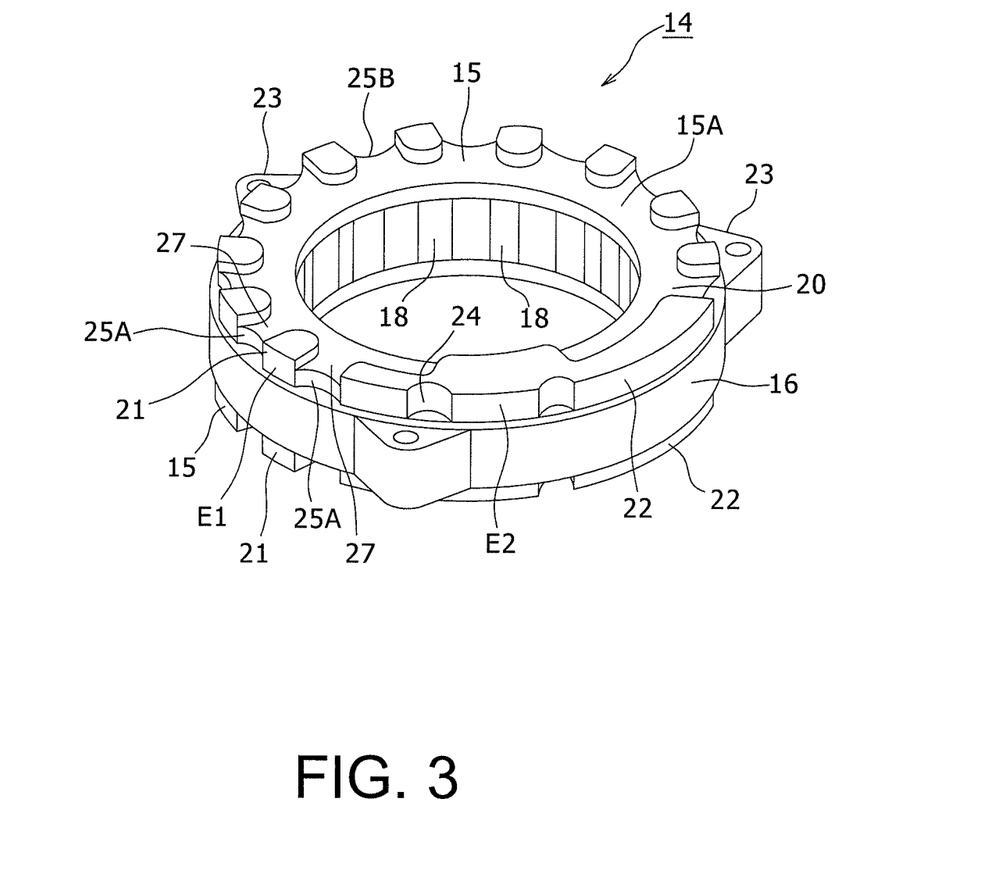
FIG. 3 is a perspective view of the stator shown in FIG. 2.
Figure 4:
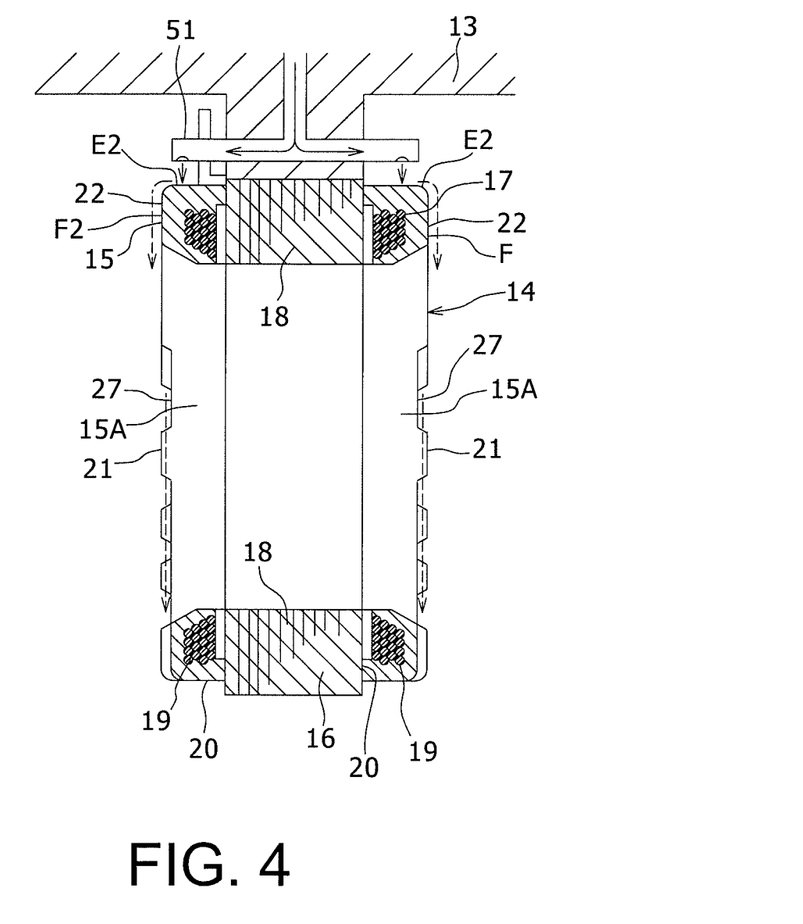
FIG. 4 is a view corresponding to a cross-section A-A in FIG. 2, and shows a state in which the stator is fixed in a case.

FIG. 3 is a perspective view of the stator 14 shown in FIG. 2. FIG. 4 is a view corresponding to a cross-section A-A in FIG. 2, and shows a state in which the stator 14 is fixed in the motor case 13. The stator 14 includes a stator core 16, stator coils 17 of a plurality of phases (more specifically, three phases, namely, a u phase, a v phase and a w phase) that are wound around an inner circumferential portion of the stator core 16, and the annular resin portions 15. A plurality of teeth 18 that protrude to the inner side in the radial direction (toward the rotor 30 (FIG. 1)) are arranged with spaces therebetween along the circumferential direction of the stator 14 on the inner circumferential face of the stator core 16. The stator core 16 has a laminated body that is fabricated by laminating a plurality of electromagnetic steel plates on one another. Coupling flanges 23 are provided at a plurality of positions in the circumferential direction on the outer circumferential face of the stator core 16. The stator 14 is fixed to the motor case 13 using bolts that penetrate the coupling flanges 23. The stator core 16 may also be formed of a dust core that is obtained by pressure-forming magnetic powder and a resin binder.

The stator coils 17 of the respective phases are wound around the teeth 18 in a concentrated winding or a distributed winding. The stator coils 17 includes coil ends 19 that are provided at portions that protrude in the axial direction from both ends in the axial direction of the stator core 16.

The respective annular resin portions 15 cover the coil ends 19 and are fixed to the stator core 16 and, together with the coil ends 19, form annular resin-molded coil ends 20. The cross-sections of the resin-molded coil ends 20 on both sides in the axial direction are schematically illustrated using rectangles in FIG. 1.

As shown in FIG. 2 to FIG. 4, each annular resin portion 15 includes an annular main body portion 15A provided on the stator core 16 side in the axial direction of the stator 14, and a plurality of island portions 21, 22 that protrude in the axial direction with spaces therebetween from a plurality of positions in the circumferential direction of an axially outer end face of the annular main body portion 15A. In FIG. 2, the plurality of island portions 21, 22 are indicated by oblique lattice portions.

As shown in FIG. 2, the plurality of island portions 21, 22 include a plurality of first island portions 21 that are arranged approximately uniformly in the circumferential direction in a certain area in the circumferential direction and that have first maximum circumferential lengths L1, La1, and a second island portion 22 that has a second maximum circumferential length L2 that is greater than the first maximum circumferential lengths L1, La1 of the respective first island portions 21. Note that in the present specification, the term "maximum circumferential length" refers to, with respect to the respective first island portions 21 or the second island portion 22, the circumferential length thereof at a position in the radial direction at which the circumferential length becomes the maximum on the same circumference that is centered on the central axis O of the stator 14. The maximum circumferential lengths L1, La1 of the respective first island portion 21 are taken as being the same, although they may be different. The second island portion 22 is formed in a substantially circular arc shape at a position that includes an upper half portion of the annular resin portion 15, and has a function of causing oil that was supplied from an oil injection pipe 51, described later, and has landed at impinging portions P1 and P2 on the outer circumferential face thereof to flow in the circumferential direction. Thus, the second island portion 22 is formed at a position such that oil impinges on the outer circumferential face thereof.

The first island portions 21 have a first island portion-side outer circumferential face E1 that is an outside face in the radial direction that protrudes in the axial direction along the outer circumferential face of the annular main body portion 15A, and are disposed near the outer diameter of the annular main body portion 15A. Each first island portion 21 has a curved surface portion having an arc-like cross section at a continuous portion between both side faces in the circumferential direction and an inner side face in the radial direction.

The second island portion 22 has a second island portion-side outer circumferential face E2 that is an outside face in the radial direction that protrudes in the axial direction along the outer circumferential face of the annular main body portion 15A.

A curved surface portion having an arc-like cross section or a tapered face that inclines with respect to the axial direction may be formed at a continuous portion between the outer circumferential faces E1, E2 and axial end faces F1, F2.

Although an intermediate portion in the circumferential direction of an inner circumferential end of the second island portion 22 substantially reaches an innermost end in the radial direction of the annular resin portion 15, both end portions in the circumferential direction of the inner circumferential end of the second island portion 22 do not reach the innermost end in the radial direction of the annular resin portion 15. By this means, in the axial end faces of the annular resin portions 15, a stepped face 26 is formed on an inner side in the radial direction of both end portions in the circumferential direction of the second island portion 22. The stepped face 26 is formed so as to cause oil that was injected in the radial direction from the axial passages 35 on the inner side at the inner circumferential end of the second island portion 22 to flow to the outer side in the circumferential direction of the second island portion 22 along the stepped face 26.

By forming the plurality of island portions 21, 22 in the annular resin portions 15, oil that flowed in the circumferential direction along the outer circumferential face of the respective island portions 21, 22 is caused to flow downward through oil relief grooves 27 formed between the respective island portions 21, 22, for example, between the second island portion 22 and the first island portions 21, and the oil that has flowed downward can be caused to flow downward while changing direction at the side faces of the first island portions 21. By this means, the respective island portions 21, 22 prevent the occurrence of a situation in which the oil flows to only one part of the surface of the annular resin portions 15.

Since the second island portion 22 has the second maximum circumferential length L2 that is greater than the first maximum circumferential lengths L1, La1 of the respective first island portions 21, many portions in the circumferential direction of the respective annular resin portions 15 can be cooled with oil and thus the coolability of the stator coils 17 can be improved. This will be described later.

The first maximum circumferential lengths L1, La1 of the respective first island portions 21 are made less than or equal to a circumferential length Lb1 (L1, La1≤Lb1) between adjacent first island portions 21, and more preferably are made less than the circumferential length Lb1 (L1, La1<Lb1) that is the minimum interval between adjacent first island portions 21. By this means, it is easier for oil to pass from one side in the radial direction to the other side in the radial direction through the oil relief grooves 27 between the adjacent first island portions 21.

In addition, the respective annular resin portions 15 include outer circumferential concave grooves 24 and a plurality of second outer circumferential concave grooves 25A, 25B that are provided in the outer circumferential face thereof. The respective outer circumferential concave grooves 24 are provided in a recessed manner in a curved surface shape in the upper half portion of the annular resin portion 15 so as to make the second island portion-side outer circumferential face E2 of the second island portion 22 and the outer circumferential face of the annular main body portion 15A continuous in the axial direction. One end in the axial direction of each outer circumferential concave groove 24 (end on the opposite side to the stator core 16, that is the front-side end in FIG. 2) opens upon reaching the axial outer end of the second island portion 22. The other end in the axial direction of each outer circumferential concave groove 24 (end on the stator core 16 side, that is the rear-side end in FIG. 2) is blocked at the outside face in the axial direction of the stator core 16. By this means, after oil that has landed on the outer circumferential face of the second island portion 22 has accumulated in the relevant outer circumferential concave groove 24, oil that overflows from one end in the axial direction of the outer circumferential concave groove 24 flows downward. In particular, among the two outer circumferential concave grooves 24 shown in FIG. 2, the bottom of the outer circumferential concave groove 24 on the right side is lower than the two ends in the circumferential direction of the outer circumferential concave groove 24. Consequently, oil that overflows in the axial direction in the outer circumferential concave groove 24 on the right side is liable to flow downward. Further, since the direction and speed of oil flowing in the circumferential direction over the outer circumferential face of the second island portion 22 change abruptly at the outer circumferential concave grooves 24, an irregular flow of the oil tends to arise. By this means also, oil is liable to flow downward from one end in the axial direction of the outer circumferential concave grooves 24. Accordingly, excessive flow of oil in the circumferential direction of the second island portion 22 can be suppressed, and the occurrence of a situation in which the amount of oil that flows downward from the axial end face of the second island portion 22 decreases excessively can be prevented.

A configuration may also be adopted in which the outer circumferential concave grooves 24 are not provided in the outer circumferential face of the respective annular main body portions 15A, and are provided only in the second island portion-side outer circumferential face E2. Further, a configuration may be adopted in which only one outer circumferential concave groove 24 is provided in the outer circumferential face of the annular resin portions 15.

The second outer circumferential concave grooves 25A, 25B are provided along the axial direction so as to be recessed in a curved surface shape between adjacent first island portions 21 in the circumferential direction and between the first island portions 21 and the second island portion 22 in the outer circumferential face of each annular main body portion 15A. The second outer circumferential concave grooves 25A are provided in the upper half portion of the annular main body portion 15A. The second outer circumferential concave grooves 25B are provided in the lower half portion of the annular main body portion 15A. One end in the axial direction of the second outer circumferential concave grooves 25A, 25B opens upon reaching the axial outer end of the annular main body portion 15A, and the other end in the axial direction is blocked at the outside face in the axial direction of stator core 16. Since the direction and speed of oil flowing in the circumferential direction over the outer circumferential face of the annular main body portion 15A change abruptly at the second outer circumferential concave grooves 25A of the upper half portion, irregular flow of the oil tends to arise. Consequently, oil is liable to flow downward from one end in the axial direction of the second outer circumferential concave grooves 25A. Therefore, the occurrence of a situation in which the oil flows to only one part of the surface of the annular resin portion 15 can be prevented. A configuration may also be adopted in which the second outer circumferential concave grooves 25B of the lower half portion are not provided in the outer circumferential face of the annular main body portion 15A.

A terminal coupling portion 28A is integrally formed in the outer circumferential face of the annular resin portion 15 on one side in the axial direction. Power lines 29 that connect respective phase terminals 28B and the stator coils 17 of the respective phases are led out from the outside face of the terminal coupling portion 28A in the radial direction thereof. The terminal coupling portion 28A is omitted from the illustration in FIG. 3.

Electric power is supplied to the stator coils 17 through the power lines 29 from a not shown power source. As the result of alternating current of a plurality of phases flowing through the stator coils 17 of the plurality of phases, the teeth 18 that are arranged at a plurality of locations in the circumferential direction are magnetized, and a rotating magnetic field that rotates in the circumferential direction is generated in the stator 14. The rotating magnetic field formed in the teeth 18 acts on the rotor 30 from a distal end face thereof.

Reverting to FIG. 1, the cooling portion 50 includes an oil path 52 having an upstream end that is connected to an oil accumulation portion 60 provided on the lower inner side of the motor case 13, an oil pump 53 provided in the oil path 52, and the oil injection pipe 51. A downstream end of the oil path 52 branches into a first path 54 and a second path 55. A downstream end of the first path 54 is connected to the oil injection pipe 51. A downstream end of the second path 55 is connected to the inside of the shaft-side coolant passage 41 of the rotating shaft 40. The oil pump 53 sucks oil from the accumulation portion 60 and discharges the oil to the downstream side. An oil cooler that cools oil by means of air flowing outside may also be provided in the oil path 52.

As shown in FIG. 2, on the upper side of the stator 14, the oil injection pipe 51 is disposed in such a manner that the position thereof deviates to the side of the terminal coupling portion 28A from directly over the central axis O of the stator 14. Two injection holes 56 are formed in both end portions of the oil injection pipe 51, and oil is injected in injection directions indicated by arrows α from the respective injection holes 56. By this means, the oil injection pipe 51 supplies oil from the upper side of the annular resin portion 15, and the oil impinges at the impinging portions P1, P2 of the second island portion-side outer circumferential face E2. The impinging portions P1, P2 may also be positioned linearly facing in the injection directions of the oil (directions of the arrows α in FIG. 2). Although in some cases the positions of the impinging portions P1, P2 may differ depending on the injected amount of oil, the injected amount of oil as a condition for determining the position of the second island portion 22 is taken as the maximum injected amount during use. The injection holes 56 may also be set so that oil impinges not only on the second island portion-side outer circumferential face E2, but also impinges on the outer circumferential face of the annular main body portion 15A at the same positions with respect to the circumferential direction as the second island portion 22.

Note that the oil injection pipe 51 may also be disposed at a position facing the annular resin portion 15 directly over the central axis O of the stator 14. A configuration may also be adopted in which only one injection hole 56 is provided at both end portions of the oil injection pipe 51, respectively.

In the above described rotary electrical machine cooling apparatus 10, when cooling the rotary electrical machine 12 by means of the cooling portion 50, the oil pump 53 is driven to suck out oil from the accumulation portion 60 and cause the oil to flow to the downstream side of the first path 54 and the second path 55. By this means, oil is injected towards the second island portion-side outer circumferential face E2 of each of the annular resin portions 15 from both end portions of the oil injection pipe 51. As indicated by broken-line arrows in FIG. 2, the injected oil flows downward while flowing to both sides in the circumferential direction of the annular resin portion 15 and to the outer side in the axial direction. In this case, since the second maximum circumferential length L2 of the second island portion 22 is greater than the first maximum circumferential lengths L1, La1 of the first island portions 21, the oil can be received on the outer circumferential face that has a large area. Further, oil that has flowed to a long portion in the circumferential direction on the second island portion-side outer circumferential face E2 flows downward along the oil relief grooves 27 between the two ends in the circumferential direction of the second island portion 22 and the first island portions 21. In this case, as shown by broken lines β in FIG. 2, the oil that passes through the oil relief grooves 27 flows downwards along the surface of the annular resin portion 15 while colliding against different first island portions 21. By this means, oil can be caused to flow over and cool many portions in the circumferential direction of the annular resin portion 15.

Further, since the first maximum circumferential lengths L1, La1 of the respective first island portions 21 are small, the widths of the oil relief grooves 27 between the adjacent first island portions 21 can be made a large width. As a result, the coolability of the stator coils 17 can be improved.

In addition, since the outer circumferential concave grooves 24 and the second outer circumferential concave grooves 25B of the upper half portion are formed in the outer circumferential face of the annular resin portion 15, the oil can be dispersed to a greater number of portions of the surface of the annular resin portion 15 and caused to flow thereon.

Further, oil that was supplied to the core-side coolant passage 32 of the rotor 30 from the cooling portion 50 is injected in the direction indicated by arrows 7 in FIG. 2 towards the outside in the radial direction from both end portions of the plurality of axial passages 35 of the core-side coolant passage 32, that is, towards the inner circumferential face of the annular resin portions 15. As indicated by arrows with an alternate long and short dash line, the injected oil passes between the island portions 21, 22 and flows around to the outer diameter side of the annular resin portions 15, and flows downward from the outer diameter side while contacting the outer circumferential face or axial end face of the annular resin portion 15. In this case also, some oil passes between adjacent island portions 21, 22 from the outer diameter side of the annular resin portions 15 and passes through to the inner side in the radial direction, and flows downward along the surface of the annular resin portion 15 while colliding against different island portions 21. Consequently, oil can be caused to flow over a greater number of portions of the surface of the annular resin portions 15, and hence the coolability of the stator coils 17 can be further improved.

Furthermore, since some of the oil that is injected to the inner diameter side of the annular resin portions 15 from both end portions of the axial passages 35 collides with the inner end in the radial direction of the island portions 21, 22, the vicinity of those island portions 21, 22 can be effectively cooled.

Figure 5:
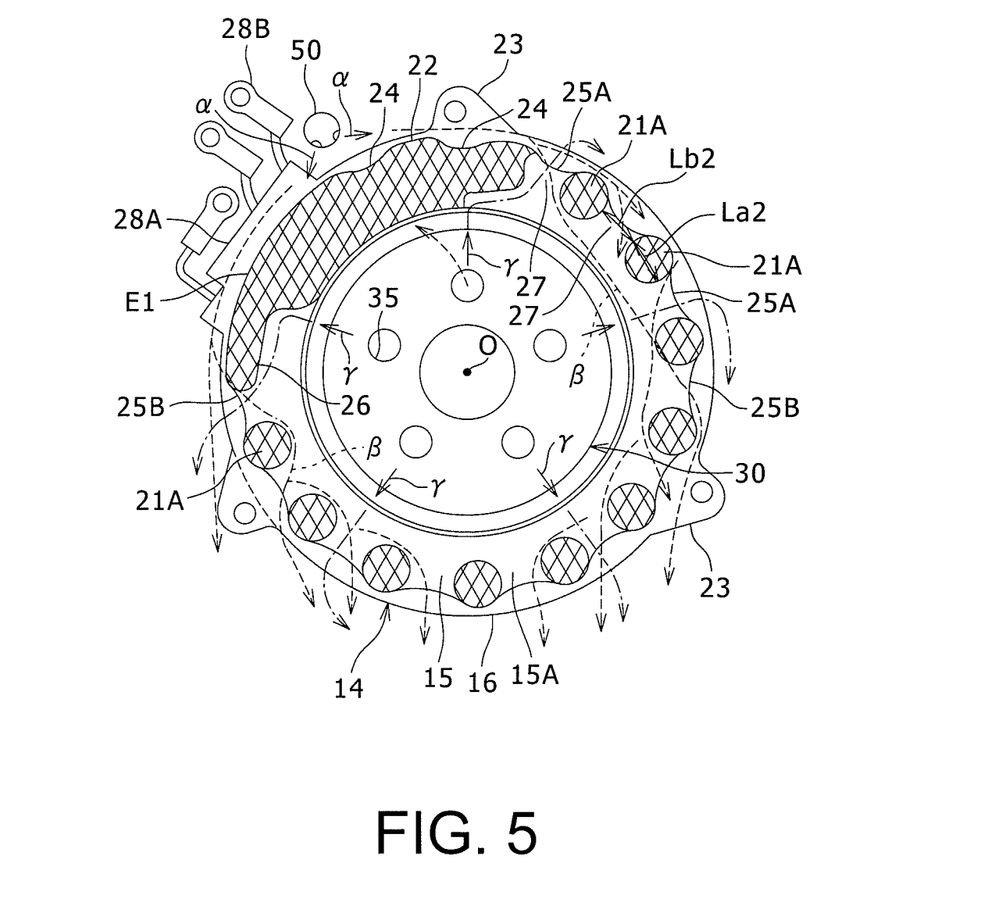
FIG. 5 is a view corresponding to FIG. 2, that shows a stator and a rotor in a rotary electrical machine cooling apparatus according to a different example of the embodiment of the present invention.

FIG. 5 is a view that corresponds to FIG. 2. FIG. 5 illustrates the stator 14 and the rotor 30 in a different example of the rotary electrical machine cooling apparatus according to an embodiment of the present invention. In the present example, in the respective annular resin portions 15, first island portions 21A provided at a plurality of positions in the circumferential direction of the axial end face are formed in a cylindrical shape. Further, a first maximum circumferential length La2 of each first island portion 21A is made equal to or less than a circumferential length Lb2 between adjacent first island portions 21A (La2≤Lb2), and more preferably is made less than the circumferential length Lb2 between adjacent first island portions 21A (La2<Lb2). By adopting the above described configuration also, similarly to the configuration illustrated in FIG. 1 to FIG. 4, oil can be caused to flow over a large number of portions in the circumferential direction on the annular resin portions 15, and hence the coolability of the stator coils can be improved. The remaining configuration and actions are the same as in the configuration illustrated in FIG. 1 to FIG. 4.

Note that the shapes of the respective island portions 21, 22, 21A including the second island portion 22 are not limited to the shapes illustrated in FIG. 2 and FIG. 5, and the cross-sectional shape of the respective island portions 21, 22, 21A may be rectangular, polygonal, elliptical or the like.

While an embodiment for carrying out the present invention has been described above, the present invention is by no means limited to the foregoing embodiment, and naturally the present invention may be implemented in various forms within a range that does not depart from the gist of the present invention. For example, although cases have been described above in which the annular resin portions 15 having the plurality of island portions 21, 22, 21A are provided on both sides in the axial direction of the stator 14, a configuration may also be adopted in which, of the annular resin portions on both sides in the axial direction of the stator 14, only one of the annular resin portions in the axial direction has the plurality of island portions 21, 22. Further, although the respective island portions 21, 22 have been described as having a configuration that includes the outer circumferential faces E1, E2 that protrude in the axial direction along the outer circumferential face of the annular main body portions 15A, a configuration may also be adopted in which the respective island portions 21, 22 include the outer circumferential faces E1, E2 that protrude in the axial direction from positions that deviate to the inner diameter side relative to the outer circumferential face of the annular main body portions 15A.

Further, in the rotary electrical machine 12, in a case where end plates are provided on both sides in the axial direction of the rotor 30, a configuration may also be adopted in which a plate-side coolant passage as an inner-diameter-side coolant injection portion is provided in each end plate, and coolant is injected to the inner diameter side of each annular resin portion 15 from the plate-side coolant passage. Furthermore, in the rotating shaft 40, radial passages as inner-diameter-side coolant injection portions may be provided at portions that deviate to both sides in the axial direction from the rotor 30, and coolant may be injected to the inner diameter side of the respective annular resin portions 15 from an outer end opening of the radial passages. A configuration may also be adopted in which the rotary electrical machine 12 does not inject coolant from the rotor 30 side towards the inner circumferential face of the respective annular resin portions 15, and instead injects coolant only from the upper side of the respective annular resin portions 15.

The invention claimed is:

1. A rotary electrical machine cooling apparatus, comprising:
   a rotary electrical machine including a stator and a rotor, in which the stator has an annular resin portion which covers a coil end; and
   a cooling portion that injects a coolant from an upper side to the annular resin portion,
   wherein:
   the annular resin portion includes an annular main body portion that is provided on a stator core side in an axial direction of the stator, and a plurality of island portions that protrude in an axial direction from the annular main body portion, which is a direction parallel to a rotation central axis of the rotor, from a plurality of positions in a circumferential direction of an axially outer end face of the annular main body portion; and
   the plurality of island portions include a plurality of first island portions that each have a first maximum circumferential length, and a second island portion that has a second maximum circumferential length which is greater than the first maximum circumferential length of the respective first island portions and that is formed at such a position that the coolant impinges on an outer circumferential face thereof and that causes the coolant that impinges on the outer circumferential face to flow in a circumferential direction.

2. The rotary electrical machine cooling apparatus according to claim 1, wherein:
   the annular resin portion includes, in an upper half portion, an outer circumferential concave groove that is provided in an outer circumferential face of the second island portion, and one end in an axial direction of the outer circumferential concave groove reaches an axial outer end of the second island portion.

3. The rotary electrical machine cooling apparatus according to claim 1, wherein:
the annular resin portion includes, in an upper half portion of an outer circumferential face of the annular main body portion, a second outer circumferential concave groove that is provided between the first island portions that are adjacent in a circumferential direction or between the first island portions and the second island portion, and one end in an axial direction of the second outer circumferential concave groove reaches an axial outer end of the annular main body portion.

4. The rotary electrical machine cooling apparatus according to claim 2, wherein:
the annular resin portion includes, in an upper half portion of an outer circumferential face of the annular main body portion, a second outer circumferential concave groove that is provided between the first island portions that are adjacent in a circumferential direction or between the first island portions and the second island portion, and one end in an axial direction of the second outer circumferential concave groove reaches an axial outer end of the annular main body portion.

5. The rotary electrical machine cooling apparatus according to claim 1, wherein:
the rotary electrical machine includes an inner-diameter-side coolant injection portion that injects a coolant towards an inner circumferential face of the annular resin portion.

6. The rotary electrical machine cooling apparatus according to claim 2, wherein:
the rotary electrical machine includes an inner-diameter-side coolant injection portion that injects a coolant towards an inner circumferential face of the annular resin portion.

7. The rotary electrical machine cooling apparatus according to claim 3, wherein:
the rotary electrical machine includes an inner-diameter-side coolant injection portion that injects a coolant towards an inner circumferential face of the annular resin portion.

8. The rotary electrical machine cooling apparatus according to claim 4, wherein:
the rotary electrical machine includes an inner-diameter-side coolant injection portion that injects a coolant towards an inner circumferential face of the annular resin portion.

* * * * *